(12) United States Patent
Vigars et al.

(10) Patent No.: US 9,086,049 B2
(45) Date of Patent: Jul. 21, 2015

(54) POWER GENERATING EQUIPMENT

(75) Inventors: Paul Vigars, Bristol (GB); Daniel Haworth, Cambridge (GB); Christopher Huxley-Reynard, Bristol (GB); Alan Smith, Bristol (GB)

(73) Assignee: TIDAL GENERATION LIMITED, Stafford (GB)

( * ) Notice: Subject to any disclaimer, the term of this patent is extended or adjusted under 35 U.S.C. 154(b) by 255 days.

(21) Appl. No.: 13/997,428

(22) PCT Filed: Dec. 5, 2011

(86) PCT No.: PCT/GB2011/052397
§ 371 (c)(1),
(2), (4) Date: Aug. 26, 2013

(87) PCT Pub. No.: WO2012/085530
PCT Pub. Date: Jun. 28, 2012

(65) Prior Publication Data
US 2013/0333371 A1    Dec. 19, 2013

(30) Foreign Application Priority Data

Dec. 23, 2010 (GB) .................................. 1021800.6

(51) Int. Cl.
*F03C 1/00* (2006.01)
*F03B 13/18* (2006.01)
(Continued)

(52) U.S. Cl.
CPC .................. *F03B 13/264* (2013.01); *E02B 9/08* (2013.01); *E02B 17/02* (2013.01); *E02B 17/08* (2013.01); *F03B 13/10* (2013.01); *F03B 17/061* (2013.01); *Y02E 10/28* (2013.01); *Y02E 10/38* (2013.01)

(58) Field of Classification Search
CPC ...... F03B 13/264; F03B 13/10; F03B 17/061; E02B 9/08; E02B 17/02; E02B 17/08; Y02E 10/38; Y02E 10/28
USPC .................................. 60/495–507; 290/42, 53
See application file for complete search history.

(56) References Cited

U.S. PATENT DOCUMENTS 3,880,103 A * 4/1975 Talkington .................... 405/185
4,512,886 A * 4/1985 Hicks et al. .............. 210/170.05
(Continued)

FOREIGN PATENT DOCUMENTS

GB     2 431 207 A     4/2007
GB     2 431 628 A     5/2007
(Continued)

OTHER PUBLICATIONS

Mar. 11, 2011 Search Report issued in Great Britain Patent Application No. GB1021800.6.
(Continued)

*Primary Examiner* — Hoang Nguyen
(74) *Attorney, Agent, or Firm* — Oliff PLC (57) ABSTRACT

Power generating equipment comprises a support structure adapted to be disposed on the bed of a body of water, a buoyant power generating apparatus having a center of buoyancy, a winching device releasably engageable with the power generating apparatus, and operable to pay out and to retract a flexible winch tether. The flexible winch tether has first and second portions releasably connectable to one another, the first portion being connectable at one end thereof to the support structure and at a second end thereof to the second portion, and the second portion being attached at one end thereof to the winching device, and being connectable at a second end thereof to the first portion.

11 Claims, 12 Drawing Sheets

(51) Int. Cl.
  *F03B 13/26* (2006.01)
  *F03B 17/06* (2006.01)
  *F03B 13/10* (2006.01)
  *E02B 9/08* (2006.01)
  *E02B 17/02* (2006.01)
  *E02B 17/08* (2006.01)

(56) References Cited

U.S. PATENT DOCUMENTS

2009/0045631 A1* 2/2009 Gibberd et al. .............. 290/53
2010/0181774 A1* 7/2010 Dehlsen et al. .............. 290/54
2011/0089696 A1* 4/2011 Davis et al. .................. 290/53

FOREIGN PATENT DOCUMENTS

GB          2 448 710 A       10/2008
GB          2 460 309 A       12/2009
WO     WO 2009/124344 A1     10/2009

OTHER PUBLICATIONS

May 2, 2012 International Search Report issued in International Patent Application No. PCT/GB2011/052397.

May 2, 2012 Written Opinion issued in International Patent Application No. PCT/GB2011/052397.

* cited by examiner

POWER GENERATING EQUIPMENT

The present invention relates to power generating equipment, and in particular to submerged power generating apparatus designed to generate electricity from water currents such as tidal flows, ocean currents or river flows.

BACKGROUND OF THE INVENTION

A key aspect in the design of water current and wave generating equipment is the method by which power generating apparatus is periodically accessed for inspection and maintenance, and deployed again for operation. This can have a significant effect on the cost of maintaining the entire machine over its lifetime.

Diverse combinations of power generating apparatus, support structure and seabed foundation have been proposed for tidal current and wave devices. Machines that employ a permanently floating, surface breaking power generating apparatus do not have a significant problem in terms of initial access for inspection/maintenance.

However, machines where the power generating apparatus is fully submerged during normal operation must on occasion be brought to the surface for inspection/maintenance. There are currently two basic schemes for such machines:
1. Schemes employing a surface braking support structure (such as a mono-pile).
   The structure itself is used as a guide to allow the power generating apparatus to be raised to the surface using some form of mechanical lifting device (e.g. hydraulic rams, or surface mounted winch) or possibly using the force of buoyancy.
2. Schemes where the support structure lies submerged (or mostly submerged) during normal operation. Such devices may consist of:
   A power generating apparatus mounted directly to a seabed foundation
   A power generating apparatus attached by cables or long articulated arms to foundations on the seabed, wherein the level of the power generating apparatus in the water column during operation is determined by its own positive buoyancy;
   A power generating apparatus mounted on a submerged lattice or tubular framework structure that supports the power generating apparatus mid water column.

Water current and wave generating devices are deployed in extreme marine environments where weather and sea state conditions can often make marine operations difficult. The speed and simplicity of the method of deployment and retrieval of the power generating apparatus, and, in particular, the tolerance of this method to moderately bad weather and sea state conditions are, therefore, important.

Generally speaking, it is considerably more difficult to deploy a submerged power generating apparatus than it is to retrieve it. The deployment requires accurate alignment and attachment of the power generating apparatus with the support structure underwater, where it is difficult to see what is happening and where accurate control of the power generating apparatus position may be difficult to achieve. Retrieval of the power generating apparatus is easier because, once detached, the power generating apparatus can be raised off the support structure quickly without the need for careful control of its alignment.

Proposed methods for deploying and retrieving submerged power generating apparatus's to/from the surface include:
  A crane or winch mounted on a surface vessel is used to lower a negatively buoyant power generating apparatus onto the support structure. Cameras, Remotely Operated Vehicles (ROVs) or divers may be used to monitor the position of the power generating apparatus as it is lowered. The power generating apparatus is raised in a similar manner. The vessel required to lower/raise a heavy power generating apparatus is expensive and may not be available at short notice. The constant motion of the vessel on the surface can pose problems for the positional control of the power generating apparatus, particularly during its deployment.
  A telescopic tube normally housed inside the support structure can be raised to the surface to allow the power generating apparatus to be fitted to it for deployment. This telescopic tube guides the negatively buoyant power generating apparatus straight up/down to/from the surface. The weight of the power generating apparatus and telescopic tube is supported by a deck mounted winch/crane on a surface vessel. This method addresses the issue of position control of the power generating apparatus, allowing the lifting/lowering operation to be performed more quickly and easily. The scheme still requires vessel mounted heavy lifting equipment, and there is a considerable overhead associated with the telescopic tube which is only used on an occasional basis. There is also the possibility of the telescopic tube jamming; with the associated risk that the machine is left in a potentially dangerous state should the weather conditions deteriorate.
  Guide wire/s running from the surface vessel down to the support structure is used to guide the power generating apparatus as it is lowered/raised through the water column. The correct tensioning of these guide wires from the support vessel requires accurate position holding and possibly heave compensation equipment, which is expensive. In the case of a water current generating machine, where there is only a short period of relatively slack water available and the deployment and recovery of the guide wires is a time consuming operation, for which there may be insufficient time.

An existing method that relates to the deployment and retrieval of power generating equipment is specified in Gibberd et al "A deployment and retrieval apparatus for submerged power generating devices", UK Patent Application GB2431628.

SUMMARY OF THE PRESENT INVENTION

According to one aspect of the present invention, there is provided power generating equipment comprising a support structure adapted to be disposed on the bed of a body of water, a buoyant power generating apparatus having a centre of buoyancy, a winching device releasably engageable with the power generating apparatus, and operable to pay out and to retract a flexible winch tether, and a flexible winch tether having first and second portions releasably connectable to one another, the first portion being connectable at one end thereof to the support structure and at a second end thereof to the second portion, and the second portion being attached at one end thereof to the winching device, and being connectable at a second end thereof to the first portion.

The support structure and the power generating apparatus may be provided with cooperating alignment parts which define a mating axis, and which are adapted to guide the power generating apparatus into engagement with the support structure, such that, when the equipment is in use, retraction of the tether by the winch device causes the power generating apparatus to be drawn downwardly through the body of water into engagement with the support structure, the centre of buoyancy of the power generating apparatus being substantially in line with the mating axis prior to such engagement, and wherein the support structure and the power generating apparatus include means for clamping the power generating apparatus into engagement with the support structure.

The means for clamping may include electrical, hydraulic and fibre optic connectors between the power generating apparatus and the support structure.

The winching device and power generating apparatus may include complementary alignment features for aligning the winching device with respect to the power generating apparatus.

The winching device may include an alignment unit operable to align the winching device with respect to the power generating apparatus.

The winching device and power generating apparatus may include complementary latching components for releasably attaching the winching device to the power generating apparatus.

The first and second portions of the tether may be connectable and disconnectable using a remotely operated vehicle.

The winching device may be buoyant.

According to another aspect of the present invention, there is provided a method of deploying a submersible buoyant power generating apparatus onto a submerged support structure disposed on a bed of a body of water, the power generating apparatus carrying a winching device which is releasably engageable with the power generating apparatus, and which is operable to pay out and to retract a flexible winch tether, the flexible winch tether having first and second portions releasably connectable to one another, the first portion being connectable at one end thereof to the support structure and at a second end thereof to the second portion, and the second portion being attached at one end thereof to the winching device, and being connectable at a second end thereof to the first portion, the method comprising attaching a free end of the first portion of the winch tether to the support structure, operating the winching device to retract the tether, such that the power generating apparatus and winching device are drawn downwardly through the body of water into engagement with the support structure, clamping the power generating apparatus into engagement with the support structure, using clamping means provided on the support structure and the power generating apparatus, disconnecting the winching device from the power generating apparatus, paying out the tether from the winching device, such that the winching device rises towards the surface of the body of water, disconnecting the first portion of the tether from the second portion of the tether, and retracting the tether in to the winching device.

Where the power generating apparatus has a centre of buoyancy, and the support structure has a mating axis, the centre of buoyancy of the power generating apparatus may be brought substantially in line with the mating axis prior to engagement thereof.

According to another aspect of the present invention, there is provided a method of retrieving a buoyant power generating apparatus mounted on a support structure located on a bed of a body of water, the power generating apparatus including a first portion of a winch tether which is attached to the support structure, the method comprising attaching a second portion of a winch tether to the first portion of the winch tether, retracting the second portion of the winch tether into a winching device, thereby causing the winching device to move to the power generating apparatus, locating the winching device on the power generating apparatus, and latching the winching device to the power generating apparatus, allowing the power generating apparatus and the winching device to float towards the surface of the body of water, and detaching the first portion of the winch tether from the support structure.

DETAILED DESCRIPTION OF THE PREFERRED EMBODIMENTS

Figure 1:
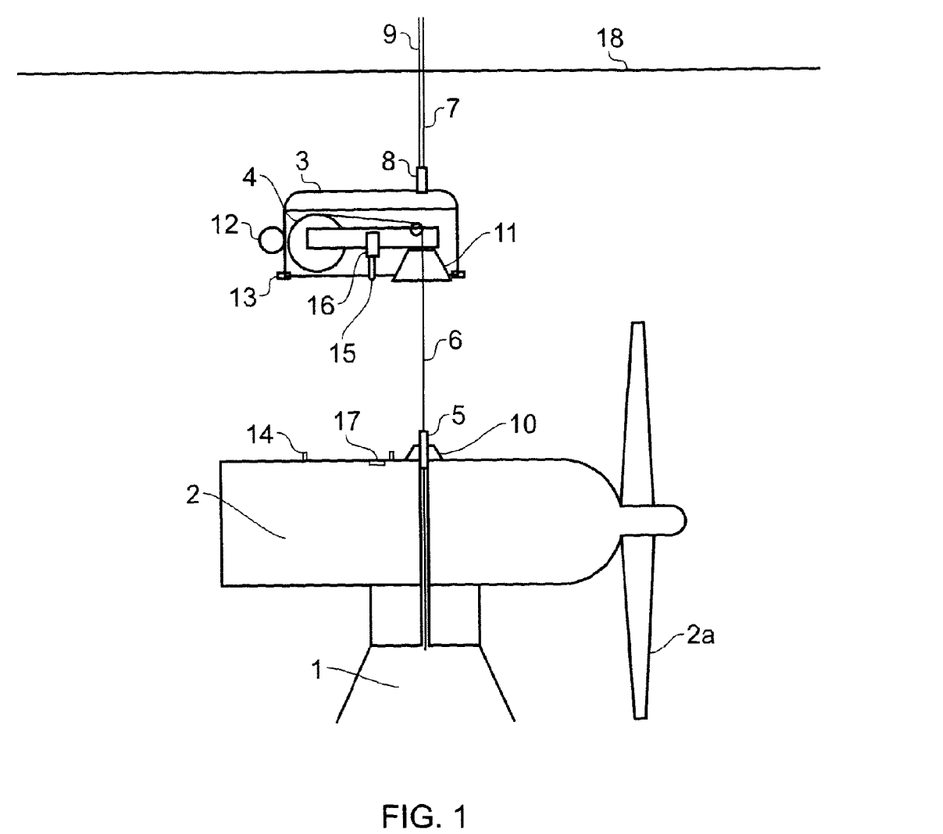
FIG. 1 is a side view of power generating equipment including an embodiment of one aspect of the present invention.

FIG. 1 illustrates power generating equipment that comprises a support structure 1, on which a power generating apparatus (power generating apparatus) 2 is removably engaged. The method of engagement of the power generating apparatus 2 with the support structure 1 is not of importance to the present invention.

A winching device 3 is provided for deployment and retrieval of the power generating apparatus 2 to and from the support structure 1. The winching device 3 is shown detached from the power generating apparatus in FIG. 1, and its operation will be described in more detail below. The power generating apparatus in FIG. 1 is a water current turbine having a blade 2a. However, the principles of the present invention may be applied to any power generating equipment that is deployed in and underwater location.

The winching device 3 includes a drive unit 4 which operates to draw in or pay out a winch tether 6. In FIG. 1, the winch tether 6 is attached to the power generating apparatus 2 by way of a coupling device 5. The winch device is attached to a surface vessel by an umbilical 7, which supplies electrical power and control signals to the winching device 3.

The winching device 3 is provided with an alignment feature 11 which engages releasably with a corresponding alignment feature 10 of the power generating apparatus power generating apparatus 2. As will be described in more detail below, the alignment features 10 and 11 enable the winching device 3 to be located on the power generating apparatus 2 at an appropriate position. The winching device 3 is rotatable about the alignment features, and can be rotated into the correct alignment with respect to the power generating apparatus 2 using a propulsion device 12, or other suitable means.

The winching device 3 includes a latching mechanism 13 that engages with corresponding features 14 on the power generating apparatus 2 such that the winching device 3 is aligned with the power generating apparatus 2, and is stable on the power generating apparatus 2 if tether tension is removed. A connector 15 is provided in the winching device 3, and is mounted on an actuator 16. The actuator 16 moves the connector 15 into engagement with a receptor 17 on the power generating apparatus 2 when the winching device 3 is aligned with, and mechanically attached to, the power generating apparatus 2. The connector 15 is used to supply power and control signals to the power generating apparatus 2 during deployment and retrieval operations.

An example operation of the winching device for deploying a power generating apparatus onto a support structure 1 will now be described with reference to FIGS. 2a to 2i and 3, which are schematic illustrations and a flow chart respectively. FIGS. 2a to 2i illustrate steps 100 to 116 of FIG. 3 respectively.

Figure 2A:
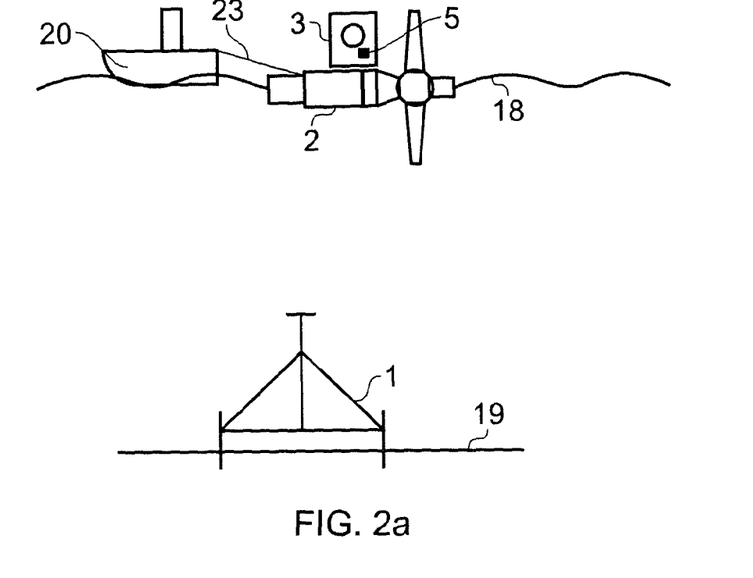
FIGS. 2a to 2i illustrate a deployment operation embodying another aspect of the present invention.

In FIGS. 2a to 2i, the support structure 1 is located on a sea bed 19, and is prepared for the reception of a power generating apparatus 2 to be mounted thereon. In FIG. 2a, the power generating apparatus 2 is towed (step 100) to the location of the support structure 1 by a vessel 20 on the water surface 18. The winching device 3 is mounted on the power generating apparatus 2, such that the alignment features 10 and 11 are aligned, and the latching mechanism 13 is engaged with the corresponding features 14 on the power generating apparatus 2.

Figure 2B:
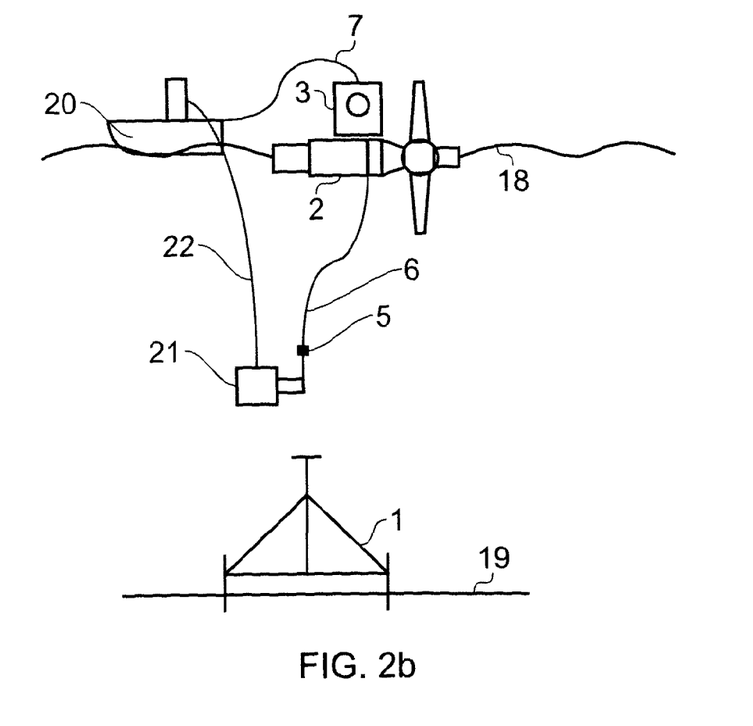

In FIG. 2b, the umbilical 7 connects the vessel 20 to the winching device 3. A remotely operated vehicle (ROV) 21 is deployed (step 102) from the vessel 20 via a control cable 22, and is used to carry the winch tether 6 to the support structure 1. As the ROV 6 descends, the winch drive unit 4 pays out the winch tether 6.

Figure 2C:
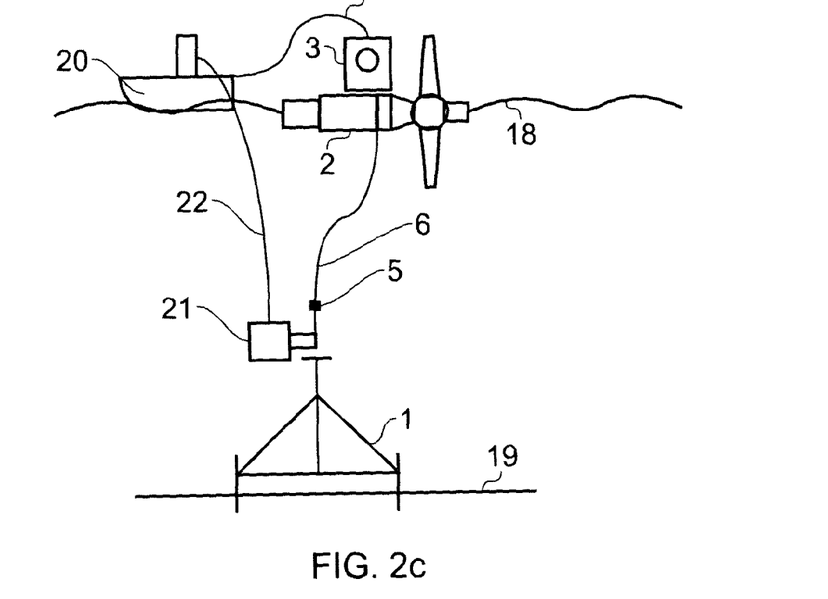

The ROV 21 connects the winch tether 6 to the support structure 1, as shown in FIG. 2c. The winching device 3 operates to take up any slack in the tether (step 104), and the ROV is removed from the support structure 1.

Figure 2D:
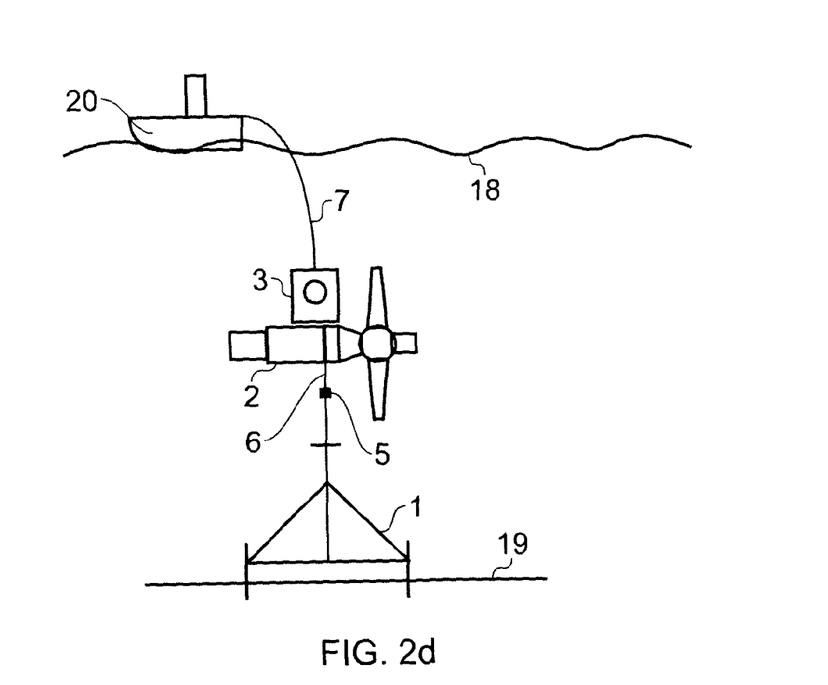

FIG. 2d (step 106) illustrates the winching device 3 operating to wind in the winch tether 6. Since the tether 6 is secured to the support structure 1, the winching device 3, and the power generating apparatus 2 are pulled down towards the support structure 1. The coupling device 5 passes through the power generating apparatus 2 prior to the power generating apparatus 2 docking with the support structure 1.

Figure 2E:
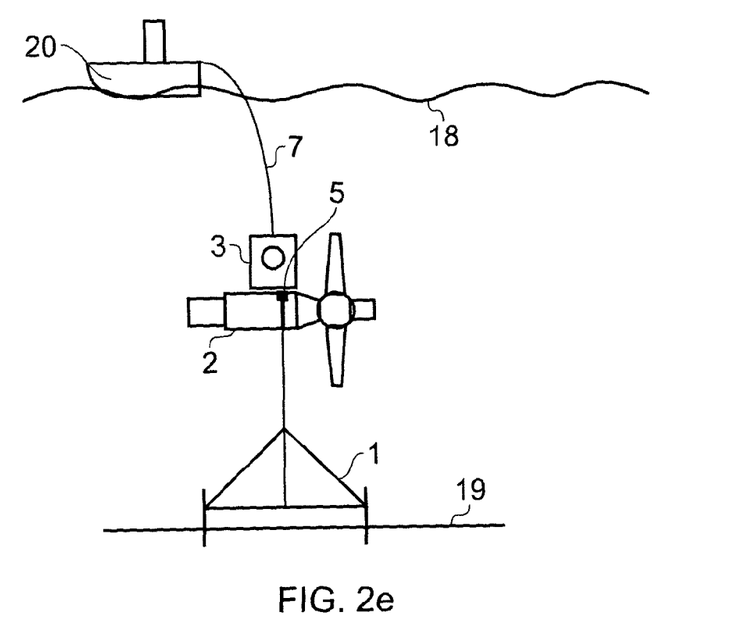

FIG. 2e shows the power generating apparatus 2 docked with the support structure 1.

Figure 2F:
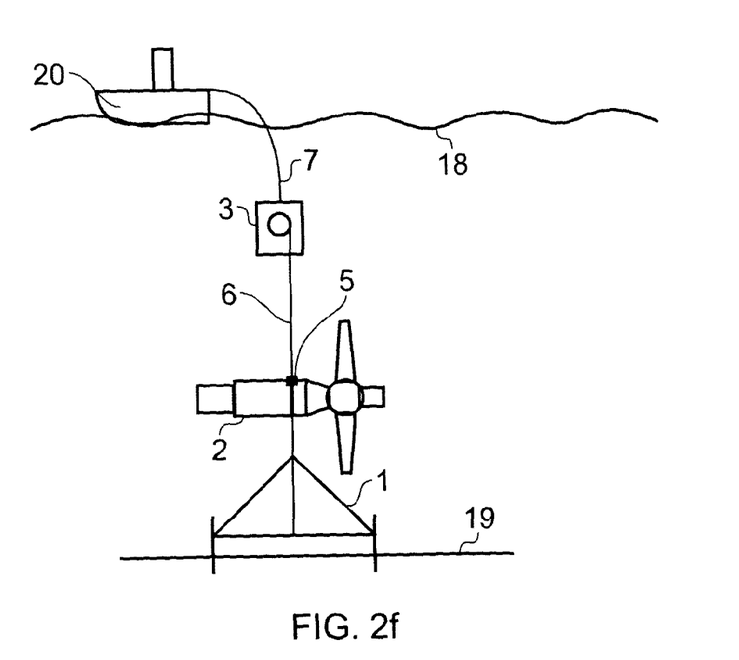
Figure 2G:
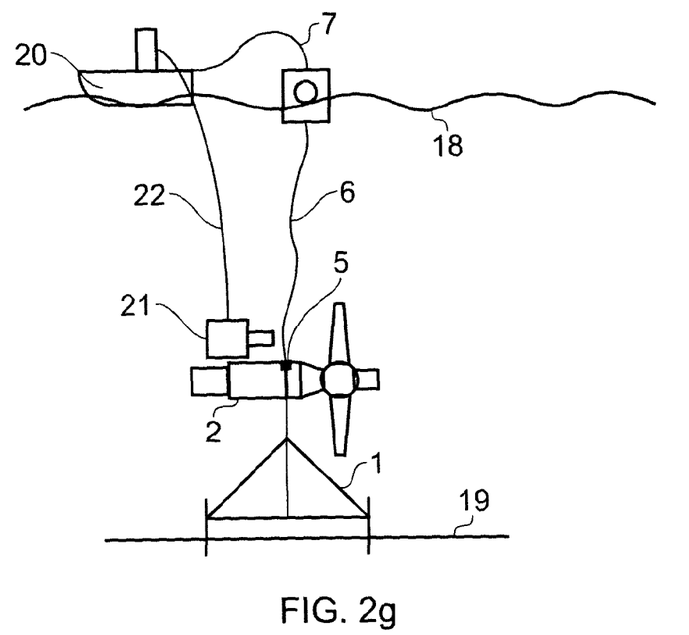

When docking (step 108) is complete, the winching device 3 releases its connections with the power generating apparatus 2 and pays out winch tether 6 for buoyant ascent to the surface 18, as shown in FIG. 2f (step 110). During the ascent of the winching device 3, the winch tether remains connected with the power generating apparatus 2, such that the ascent can be a controlled manoeuvre.

Figure 2H:
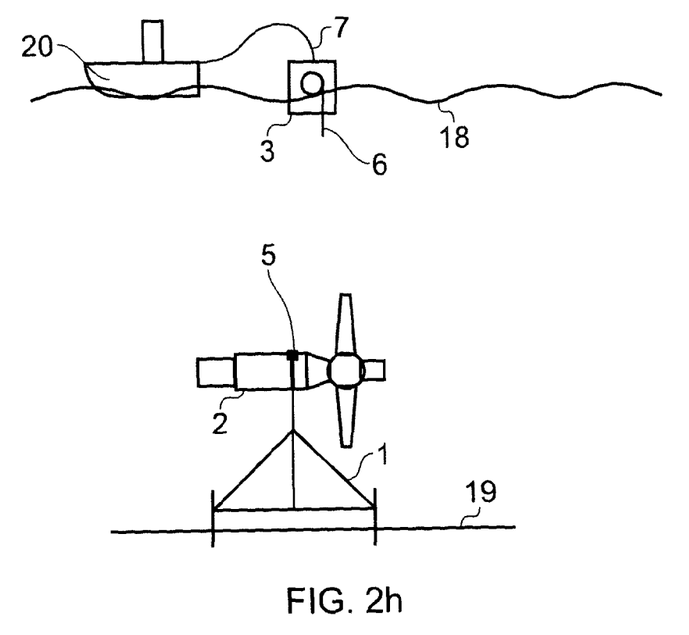

When the winching device is on the surface, the ROV 21 disengages the coupling device 5 (FIG. 2g, step 112) and the winch tether is retracted (FIG. 2h, step 114). Part of the tether 6 and part of the coupling device 5 are left attached to the support structure 1 and power generating apparatus 2 respectively, awaiting use in the retrieval operation which will be described below.

Figure 2I:
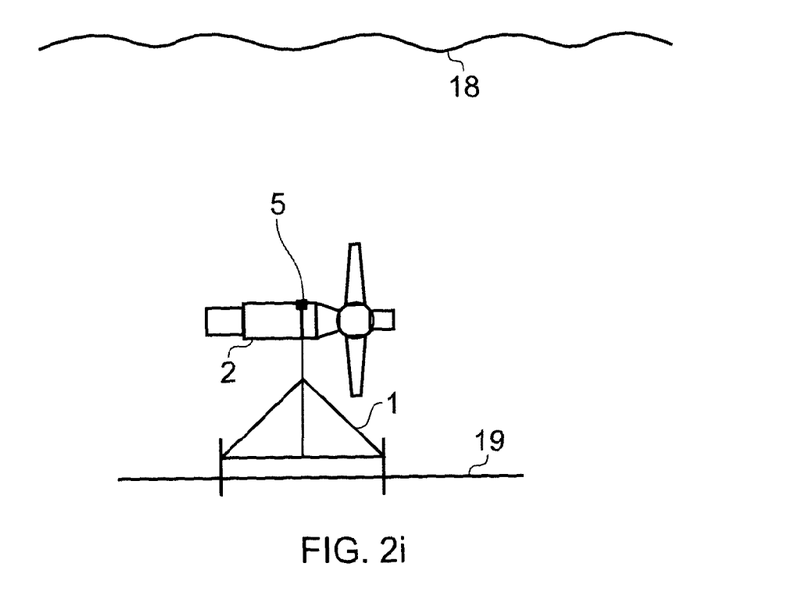
Figure 3:
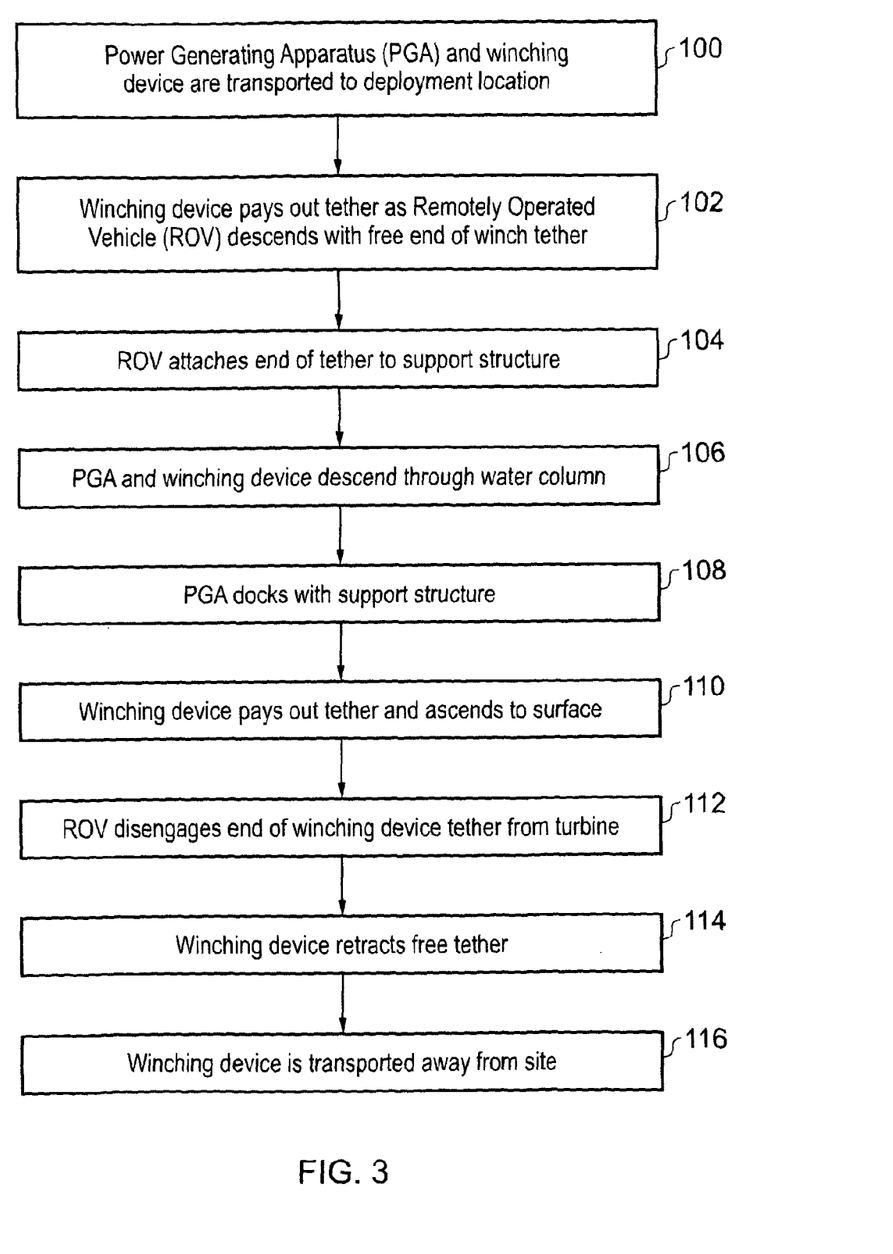
FIG. 3 is a flowchart illustrating the operation of FIG. 2.

FIG. 2i shows the completed deployment operation and the winching device can be returned (step 116) to storage or used for further marine operations.

FIGS. 4a to 4h illustrate steps in a retrieval process for the power generating apparatus deployed as described with reference to FIGS. 2a to 2h and 3. FIG. 5 is a flowchart showing the steps in such a retrieval process.

Figure 4A:
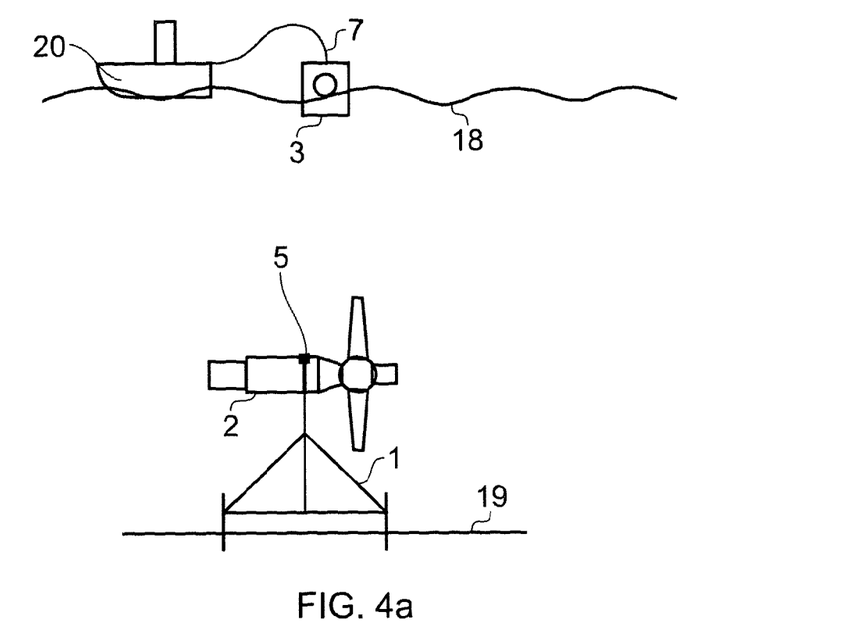
FIGS. 4a to 4h illustrate a retrieval operation embodying another aspect of the present invention.
Figure 5:
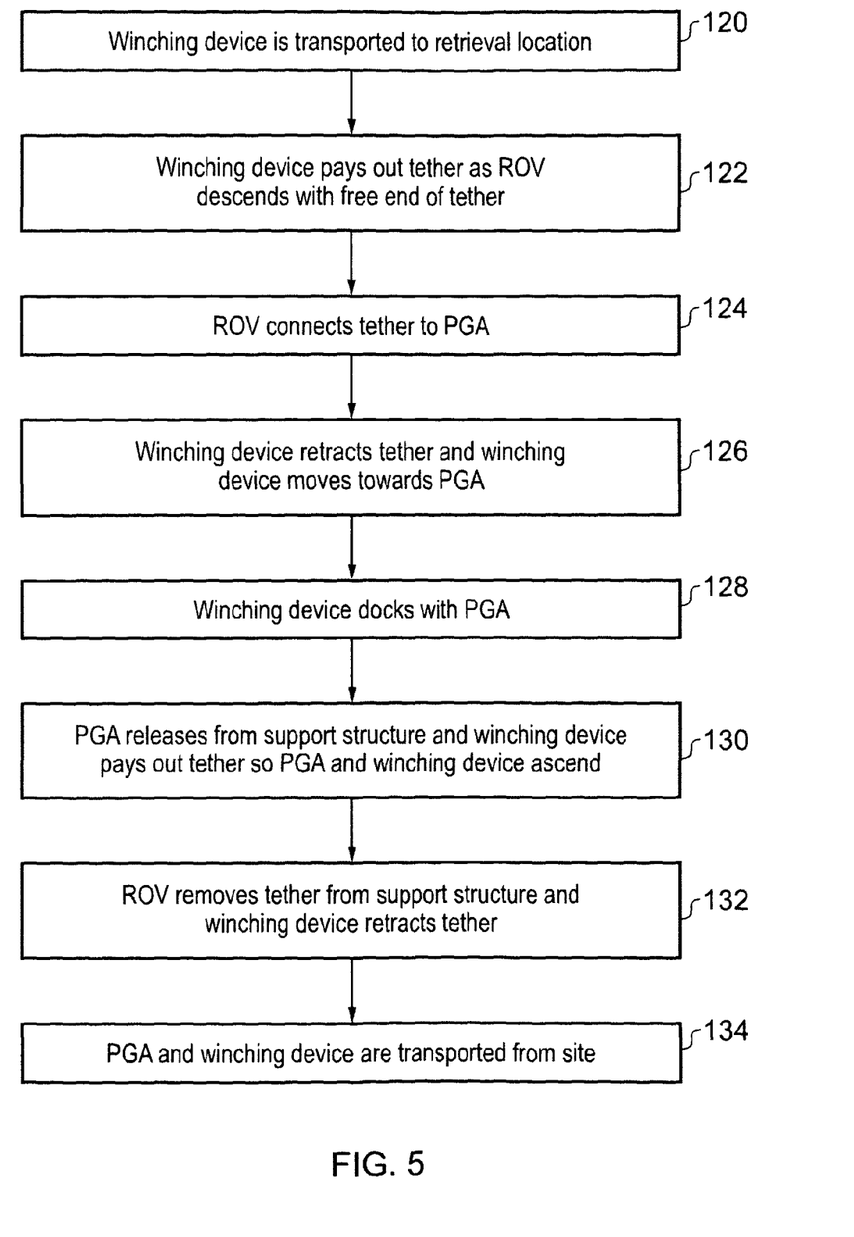
FIG. 5 is a flowchart illustrating the operation of FIG. 4.

In FIG. 4a (step 120), a retrieval vessel 20, which carries an ROV 21 (not shown) and a winching device 3, arrives at the power generating apparatus site. The support structure 1 is located on the seabed 19, and the power generating apparatus is attached to the support structure 1. The retrieval process to be described is intended to recover the power generating apparatus 2 to the water surface 18.

Figure 4B:
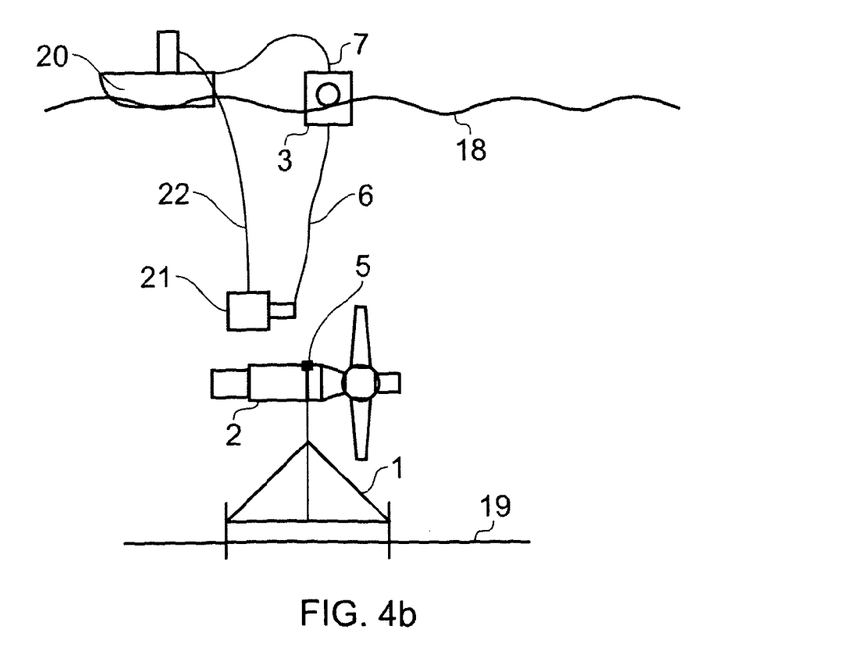
Figure 4C:
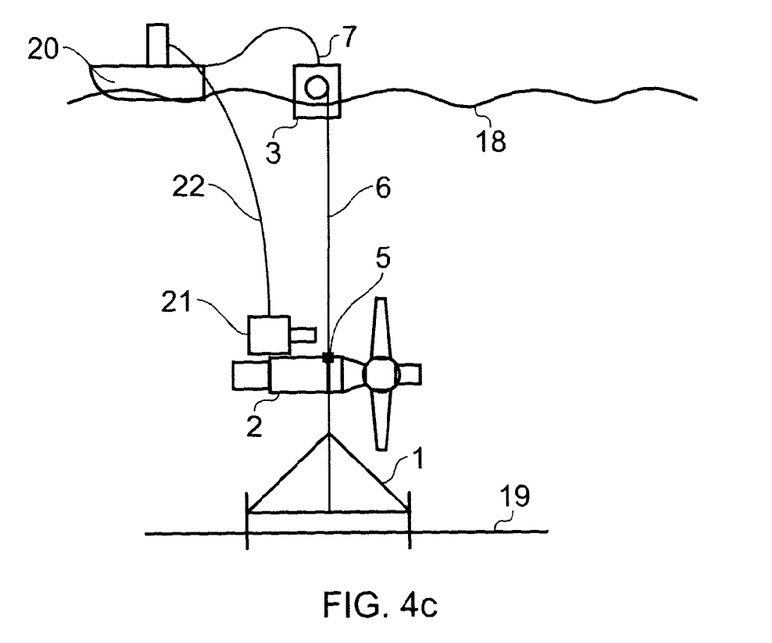

FIG. 4b (step 122) shows the ROV 21 descending with the end of the winch tether 6 as the winching device 3 pays out the winch tether 6. In FIG. 4c (step 124), the ROV 21 connects the end of the winch tether 6 to the coupling device 5 which is located on the power generating apparatus 2. The coupling device 5 is attached to the power generating apparatus 2, and to a portion of tether attached to the support structure 1. The portion of tether extends through the power generating apparatus 2 to the coupling device 5 which is located on an upper surface of the power generating apparatus 2 where it is accessible by the ROV 21.

Figure 4D:
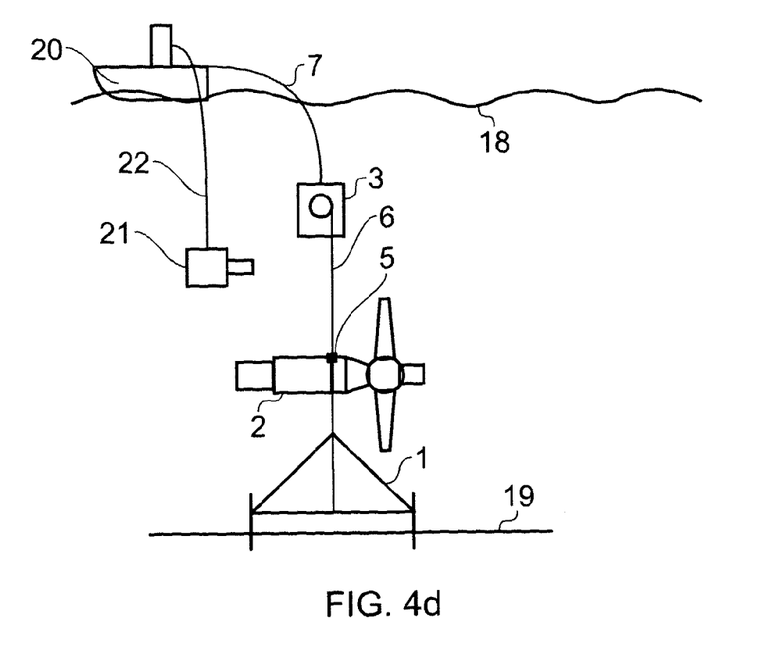

Once the winch tether 6 from the winching device 3 is connected with the coupling device 5, the winching device 3 operates to wind in the winch tether 6. Since the tether 6 is attached to the support structure 1, the action of winding in the tether 6 causes the winching device 3 to be pulled down in to contact with the power generating apparatus 2. This descent is illustrated in FIG. 4d (step 126).

Figure 4E:
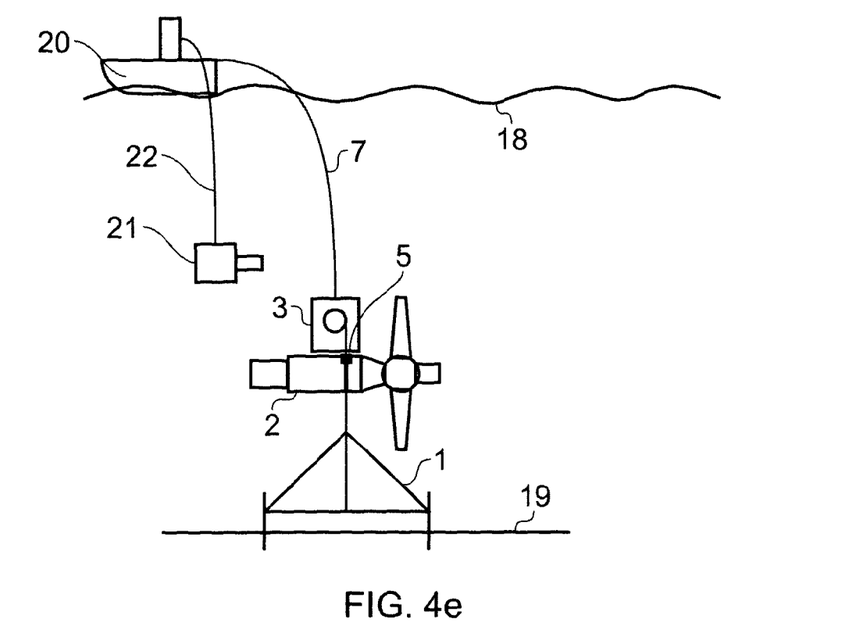

FIG. 4e (step 128) shows the winching device 3 docked with the power generating apparatus 2. The winching device 3 locates itself on the power generating apparatus 2 using the engagement features 10 and 11, and then is aligned and secured using the propulsion unit 12 and the latching mechanism 13. In addition, the actuator 16 operates to enable engagement of the connector 15 with the power generating apparatus 2.

Figure 4F:
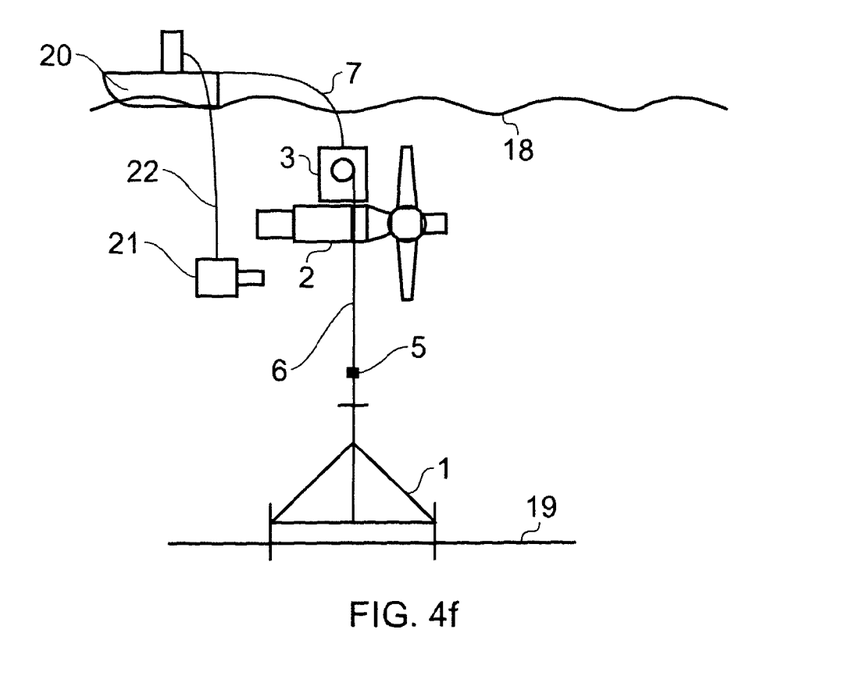

In FIG. 4f (step 130), the power generating apparatus 2 connection with the support structure 1 is released, and the power generating apparatus 2 and the winching device 3 ascend to the water surface 18 as the winching device 3 pays out the winch tether 6. In this example, the power generating apparatus 2 and the winching device 3 have positive buoyancy, and so ascend without additional assistance, although assistance could be provided by, for example, a crane on the vessel 20.

Figure 4G:
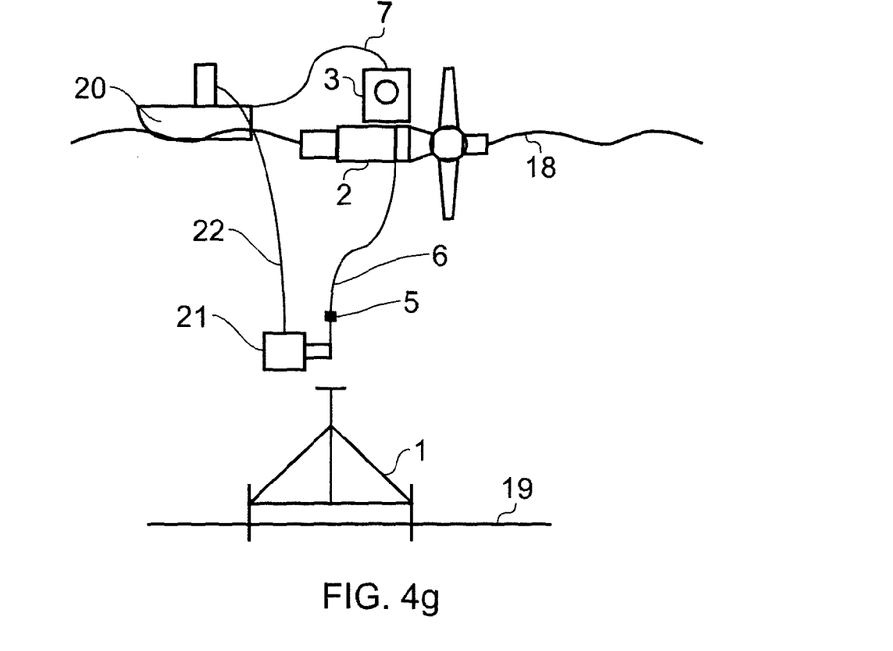
Figure 4H:
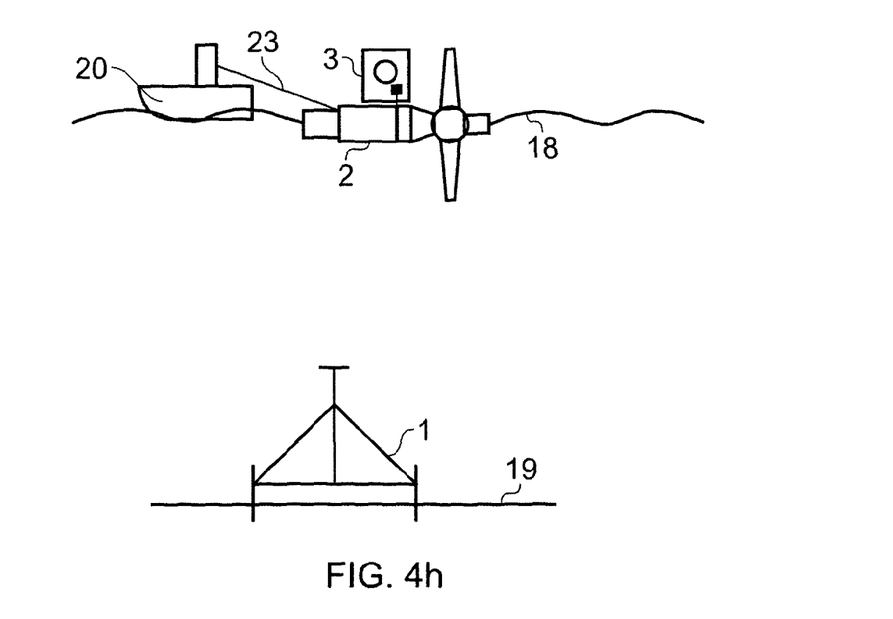

With the power generating apparatus 2 and winching device 3 on the water surface 18, as shown in FIG. 4g, the ROV removes (step 132) the end of the winch tether 6 from the support structure 1. The winching device 3 then winds in the winching tether 6 so that the tether 6 is fully retracted for transport. FIG. 4h shows the power generating apparatus 2 and winching device 3 floating on the water surface 18, with the winch tether fully retracted, ready to be transported away from the site (step 134).

It will be readily appreciated that systems and techniques embodying the present invention are able to provide significant advantages over previously considered solutions for deployment and retrieval of underwater power generating apparatus. For example, some advantages are set out below:

- Winching device is removed after deployment so the cost of the winch can be shared between multiple power generating apparatus as part of an array;
- Winching device does not stay submerged for long periods of time so corrosion and seal damage do not pose a significant problem;
- Winching device can be maintained independently of the power generating apparatus at more regular intervals;
- Winching device is more reliable as it is less exposed to the harsh environment and therefore less risk of retrieval failure;
- The power generating apparatus is free of external features which are vulnerable, lossy and hinder marine operations;
- Reduced ROV intervention;
- Quicker marine operations.

Although aspects of the invention have been described with reference to the embodiment shown in the accompanying drawings, it is to be understood that the invention is not limited to the precise embodiment shown and that various changes and modifications may be effected without further inventive skill and effort.

The invention claimed is:

1. Power generating equipment comprising:
   a support structure adapted to be disposed on the bed of a body of water;
   a buoyant power generating apparatus having a centre of buoyancy;
   a winching device releasably engageable with the power generating apparatus, and operable to pay out and to retract a flexible winch tether; and
   a flexible winch tether having first and second portions releasably connectable to one another, the first portion being connectable at one end thereof to the support structure and at a second end thereof to the second portion, and the second portion being attached at one end thereof to the winching device, and being connectable at a second end thereof to the first portion, wherein the winching device is operable to retract the flexible winch tether following attachment of the winch tether to the support structure, and to pay out the winch tether following release of the winching device from the power generating apparatus, thereby allowing the winching device to separate from the power generating apparatus.

2. Equipment as claimed in claim 1, wherein the support structure and the power generating apparatus are provided with cooperating alignment parts which define a mating axis, and which are adapted to guide the power generating apparatus into engagement with the support structure, such that, when the equipment is in use, retraction of the tether by the winch device causes the power generating apparatus to be drawn downwardly through the body of water into engagement with the support structure, the centre of buoyancy of the power generating apparatus being substantially in line with the mating axis prior to such engagement, and wherein the support structure and the power generating apparatus include means for clamping the power generating apparatus into engagement with the support structure.

3. Equipment as claimed in claim 2, wherein the means for clamping include electrical, hydraulic and fibre optic connectors between the power generating apparatus and the support structure.

4. Equipment as claimed in claim 1, wherein the winching device and power generating apparatus include complementary alignment features for aligning the winching device with respect to the power generating apparatus.

5. Equipment as claimed in claim 1, wherein the winching device includes an alignment unit operable to align the winching device with respect to the power generating apparatus.

6. Equipment as claimed in claim 1, wherein the winching device and power generating apparatus include complementary latching components for releasably attaching the winching device to the power generating apparatus.

7. Equipment as claimed in claim 1, wherein the first and second portions of the tether are connectable and disconnectable using a remotely operated vehicle.

8. Equipment as claimed in claim 1, wherein the winching device is buoyant.

9. A method of deploying a submersible buoyant power generating apparatus onto a submerged support structure disposed on a bed of a body of water, the power generating apparatus carrying a winching device which is releasably engaged with the power generating apparatus, and which is operable to pay out and to retract a flexible winch tether, the flexible winch tether having first and second portions releasably connectable to one another, the first portion being connectable at one end thereof to the support structure and connected at a second end thereof to the second portion, and the second portion being attached at one end thereof to the winching device, and being connected at a second end thereof to the first portion, the method comprising:
   attaching a free end of the first portion of the winch tether to the support structure;
   operating the winching device to retract the tether, such that the power generating apparatus and winching device are drawn downwardly through the body of water into engagement with the support structure;
   clamping the power generating apparatus into engagement with the support structure, using clamping means provided on the support structure and the power generating apparatus;
   disconnecting the winching device from the power generating apparatus;
   paying out the tether from the winching device, such that the winching device rises towards the surface of the body of water;
   disconnecting the first portion of the tether from the second portion of the tether; and
   retracting the tether in to the winching device.

10. A method as claimed in claim 9, wherein the power generating apparatus has a centre of buoyancy, and the support structure has a mating axis, the centre of buoyancy of the power generating apparatus being substantially in line with the mating axis prior to engagement thereof.

11. A method of retrieving a buoyant power generating apparatus mounted on a support structure located on a bed of a body of water, the power generating apparatus including a first portion of a winch tether which is attached to the support structure, the method comprising:
   attaching a second portion of a winch tether to the first portion of the winch tether;
   retracting the second portion of the winch tether using a winching device, thereby causing the winching device to move to the power generating apparatus;
   locating the winching device on the power generating apparatus, and latching the winching device to the power generating apparatus;
   allowing the power generating apparatus and the winching device to float towards the surface of the body of water; and
   detaching the first portion of the winch tether from the support structure.

* * * * *